(12) United States Patent
Matula et al.

(10) Patent No.: US 11,842,539 B2
(45) Date of Patent: Dec. 12, 2023

(54) AUTOMATED VIDEO STREAM ANNOTATION

(71) Applicant: Avaya Management L.P., Durham, NC (US)

(72) Inventors: Valentine C. Matula, Granville, OH (US); Manish Negi, Pune (IN); Divakar Ray, Pune (IN)

(73) Assignee: Avaya Management L.P., Durham, NC (US)

( * ) Notice: Subject to any disclaimer, the term of this patent is extended or adjusted under 35 U.S.C. 154(b) by 314 days.

(21) Appl. No.: 17/229,403

(22) Filed: Apr. 13, 2021

(65) Prior Publication Data

US 2022/0327313 A1 Oct. 13, 2022

(51) Int. Cl.
*G06V 20/20* (2022.01)
*G06V 20/40* (2022.01)
*G06F 18/214* (2023.01)

(52) U.S. Cl.
CPC ............ *G06V 20/20* (2022.01); *G06F 18/214* (2023.01); *G06V 20/40* (2022.01)

(58) Field of Classification Search
CPC ...... G06V 20/20; G06V 20/40; G06F 18/214; G06F 18/24147

USPC ........................................................ 382/157
See application file for complete search history.

(56) References Cited

U.S. PATENT DOCUMENTS

| | | | |
|---|---|---|---|
| 8,634,543 B2 | 1/2014 | Flockhart et al. | |
| 9,767,087 B1 | 9/2017 | Petrov | |
| 2009/0210779 A1 | 8/2009 | Badoiu et al. | |
| 2010/0235218 A1 | 9/2010 | Erhart et al. | |
| 2010/0296417 A1 | 11/2010 | Steiner | |
| 2011/0125793 A1 | 5/2011 | Erhart et al. | |
| 2011/0125826 A1 | 5/2011 | Erhart et al. | |
| 2019/0268470 A1* | 8/2019 | Amir | G06T 11/00 |
| 2021/0064937 A1* | 3/2021 | Nguyen | G06V 20/20 |

* cited by examiner

*Primary Examiner* — Neil R McLean
(74) *Attorney, Agent, or Firm* — Sheridan Ross P.C.

(57) ABSTRACT

Customer-agent interactions are often essential to provide services, such as to resolve issues. Methods and systems are provided to enable an artificially intelligent (AI) agent, such as a neural network to annotate a communication, such as a communication comprising a video stream. The AI may determine the subject of an issue and/or an issue to be resolved as a candidate resolution, which may further comprise annotations provided to the video stream. As a benefit the resolution, with annotations may be provided to the agent for subsequent processing and/or the customer.

20 Claims, 8 Drawing Sheets

AUTOMATED VIDEO STREAM ANNOTATION

COPYRIGHT NOTICE

A portion of the disclosure of this patent document contains material that is subject to copyright protection. The copyright owner has not objected to the facsimile reproduction by anyone of the patent document or the patent disclosure as it appears in the Patent and Trademark Office patent files or records, but otherwise reserves all copyright rights whatsoever.

FIELD OF THE DISCLOSURE

The invention relates generally to systems and methods for communications and particularly to communications comprising automated resources.

BACKGROUND

Contact centers often utilize video calls to assist customers. In current contact center scenarios, a customer connects to an agent over a video call such as to capture video to demonstrate an issue with a particular device. As a result, the agent may be presented with an image of the device in its environment (e.g., connections to other components, etc.). To provide a resolution, the agent verbally instructs the customer in an audio portion of the live call. However, these verbal instructions may be difficult for the customer to understand and follow accurately. Additionally, communication issues, such as poor network quality which may be further taxed from the demands required to convey video, may be make providing clear instructions to the customer more difficult. As a result, while video communications may work well in certain circumstances, problems often remain.

SUMMARY

In prior art contact centers an interaction, such as a live video call between a customer and an agent, the agent's vocal skill is paramount to providing clear instructions to the customer in a way that the customer can proper execute the actions required. Even during a video call, the content provided by the customer to the agent is often all that is considered, and the audio portion provided by the agent is the source of actionable information for the customer. While such communications may work well in certain circumstances, such as when the determination of the issue and the associated resolution is relatively simple, this is not always the case.

These and other needs are addressed by the various embodiments and configurations of the present invention. The present invention can provide a number of advantages depending on the particular configuration. These and other advantages will be apparent from the disclosure of the invention(s) contained herein.

In one embodiment, during a live video call with a customer an artificially intelligent agent (AI), such as a neural network, is utilized to detect possible omissions or enhancements to a human agent's instructions to be presented in the form of video annotations to a video image presented to the agent and/or customer's communication device. When presented to the agent, the agent may present a verbal description of the annotation to the customer and/or cause the annotation to be presented on the customer's communication device, such as the device utilized for the video call. The AI is trained to recognize features in an image, alone or with further benefit of audio and/or other information (e.g., type of product associated with a customer record, model identified by the customer, etc.) and provide a suggested course of action. If the AI's suggested annotation is incorrect (entirely or in part), a successful solution provided by the live agent is then utilized to subsequently train the AI to distinguish between aspects of the current image, prior images, and/or resolutions so as to "learn" and to determine when to provide a particular annotation to the video for a particular situation.

Annotations may be maintained in a data storage and, as the number annotations increases, an annotation library may be provided as a repository of resolutions for various issues for use by live agents, customers, and/or subsequent interactions with the AI. The library may comprise raw video (with annotation provided at a later time), annotated video, and/or modified annotated video, such as a video first annotated by one of a live or AI agent and modified or supplemented by the other of a live or AI agent.

As a general introduction, and in one embodiment, systems and methods are disclosed wherein an AI system provides a virtual agent, alone or in conjunction with a live agent, to conduct a live video stream with a customer's communication device to detect, diagnose, and annotate a video image with indica of a solution or other course of action.

In one example, a customer is troubleshooting a physical device, such as the setup of a printer. A call is initiated with an agent of a contact center and, if the call does not already include video, video is added to the call. The agent may prompt the customer to perform various actions so that the agent may see the current state of the device (e.g., messages presented on a display, position of switches, connection of power and data cables, etc.). The AI agent may then annotate the video image, such as a single frame of the video stream or the live video stream. As a further option, an augmented reality file may be generated comprising a dynamically presented image of the device (or portion thereof) and an annotation that moves to maintain a particular relationship with the device. As provided herein, the annotations may be selected and/or generated by an AI and presented to the agent for review and approval/modification before providing the annotated video stream to the customer. For example, the customer may be presented with a live video stream capturing an image of cables. The AI may determine that the cables are misconfigured select or generate an annotation to identify and correct the misconfiguration. As a benefit, the customer sees their device in its current environment and the relevant remedy, illustrated by the annotation, to address the misconfiguration of cables.

The live stream annotations may be sent to the AI for initial and/or subsequent training such as to analyze the video, the annotations, any case notes or customer attributes (e.g., customer resource management or CRM, entries), knowledge-based articles that may have been consulted, created, or edited, and/or the verbal or textual agent instructions to the customer in order to identify the issue and/or the proposed resolution, whether the resolution was successfully applied, and whether the applied resolution was successful. As a benefit, the trained AI may be utilized for subsequent customer interactions so that if a subsequent communication with a customer identifies an issue that has been previously encountered by the AI system, the system can identify the issue and provide similar annotations to the agent and optionally the customer. The AI may present the agent with a textual description of a resolution and/or via 'show by example' over the incoming stream. The AI system may suggest annotations or, additionally or alternatively, present the annotations to the customer automatically or upon receiving the agent's approval. However, the agent can provide modifications to the suggestions, or reject them outright, to further optimize the AI system and provide the appropriate annotations to the customer.

In another embodiment, agent provided modifications to the AI suggested annotations may be sent to a supervisor or subject matter expert for review prior to the modifications being provided to the AI training model. The supervisor or subject matter expert may provide further modifications and/or correct erroneous, confusing, or otherwise undesirable suggestions provided by the agent and better ensure the quality of the training set provided to the AI.

In another embodiment, the system performs a self-auto evaluation to check which type of customer video calls require suggested annotation support and which calls annotation support should not be considered. For example, certain customers may request more or less annotation support and/or prior successes may be evaluated and, if below a previously determined threshold, annotation support may be omitted. However, even if AI-provided annotation support is omitted, the AI model may be trained utilizing any annotations provided by the agent, such as to improve future reliability for a particular subject matter. Additionally or alternatively, the system may check attributes of the call and determine if annotations had helped, hindered, or made no difference in similar video calls conducted in the past. Therefore, even if annotations are known to be sufficiently accurate, annotations may be selectively provided or omitted for particular customers, agents, and/or subject matters if the benefits do not justify the computational and communication overhead. For example, a simple, "turn it off and on again," may be sufficiently clear and video annotations, even when accurate, may be a more of a distraction. Auto-evaluation may comprise a scoring of annotations for a particular action, wherein annotations that have a positive results (e.g., faster time to resolution than when annotations are omitted, higher customer service feedback scores, higher agent feedback score, etc.) produce a higher score and negative results lower a score. Scores may be specific to a call attribute (e.g., customer, subject matter, type of issue, etc.) and wherein annotations are subsequently provided if the score is above a threshold value, but if excluded, may be made available if requested by the agent.

In one embodiment, a system is disclosed, comprising: a network interface to a network; a processor comprising machine-readable instructions maintained in a non-transitory storage that, when read by the processor, cause the processor to perform: accessing a communication between an agent communication device and a customer communication device via the network and wherein the communication comprises a video stream captured by the customer communication device, wherein the communication comprises an issue for resolution for an object and an object image; providing the communication to a neural network trained to determine a candidate resolution; receiving, from the neural network, a candidate resolution; presenting, the video stream comprising the candidate resolution to the agent communication device, wherein the candidate resolution comprises a candidate annotation corresponding to the candidate resolution; and creating a finalized resolution from the candidate resolution and presenting indicia of the finalized resolution to the customer communication device.

In another embodiment a system is disclosed, comprising: a network interface to a network; a processor comprising machine-readable instructions maintained in a non-transitory storage that, when read by the processor, cause the processor to perform: accessing a communication between an agent communication device and a customer communication device via the network and wherein the communication comprises a video stream captured by the customer communication device, wherein the communication comprises an issue for resolution for an object and an object image; providing the communication to a neural network trained to determine a candidate subject; receiving, from the neural network, a candidate resolution comprising indicia of the candidate subject; presenting, the video stream comprising the candidate resolution to the agent communication device, wherein the candidate resolution comprises a candidate annotation corresponding to the candidate resolution; and creating a finalized resolution from the candidate resolution and presenting indicia of the finalized resolution to the customer communication device.

In another embodiment, a method is disclosed comprising: accessing a communication between an agent communication device and a customer communication device via a network and wherein the communication comprises a video stream captured by the customer communication device, wherein the communication comprises an issue for resolution for an object and an object image; providing the communication to a neural network trained to determine a candidate resolution; receiving, from the neural network, a candidate resolution; accessing, a candidate annotation corresponding to the candidate resolution; presenting, the video stream comprising the candidate resolution to the agent communication device, wherein the candidate resolution comprises the candidate annotation; and creating a finalized resolution from the candidate resolution; and presenting indicia of the finalized resolution to the customer communication device.

A system on a chip (SoC) including any one or more of the above embodiments or aspects of the embodiments described herein.

One or more means for performing any one or more of the above embodiments or aspects of the embodiments described herein.

Any aspect in combination with any one or more other aspects.

Any one or more of the features disclosed herein.

Any one or more of the features as substantially disclosed herein.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

Any of the above embodiments or aspects, wherein the data storage comprises a non-transitory storage device comprise at least one of: an on-chip memory within the processor, a register of the processor, an on-board memory co-located on a processing board with the processor, a memory accessible to the processor via a bus, a magnetic media, an optical media, a solid-state media, an input-output buffer, a memory of an input-output component in communication with the processor, a network communication buffer, and a networked component in communication with the processor via a network interface.

It is to be appreciated that any feature described herein can be claimed in combination with any other feature(s) as described herein, regardless of whether the features come from the same described embodiment.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably, and include any type of methodology, process, mathematical operation, or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising a numeric reference number, without an alphabetic sub-reference identifier when a sub-reference identifier exists in the figures, when used in the plural, is a reference to any two or more elements with a like reference number. When such a reference is made in the singular form, but without identification of the sub-reference identifier, is a reference one of the like numbered elements, but without limitation as to the particular one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
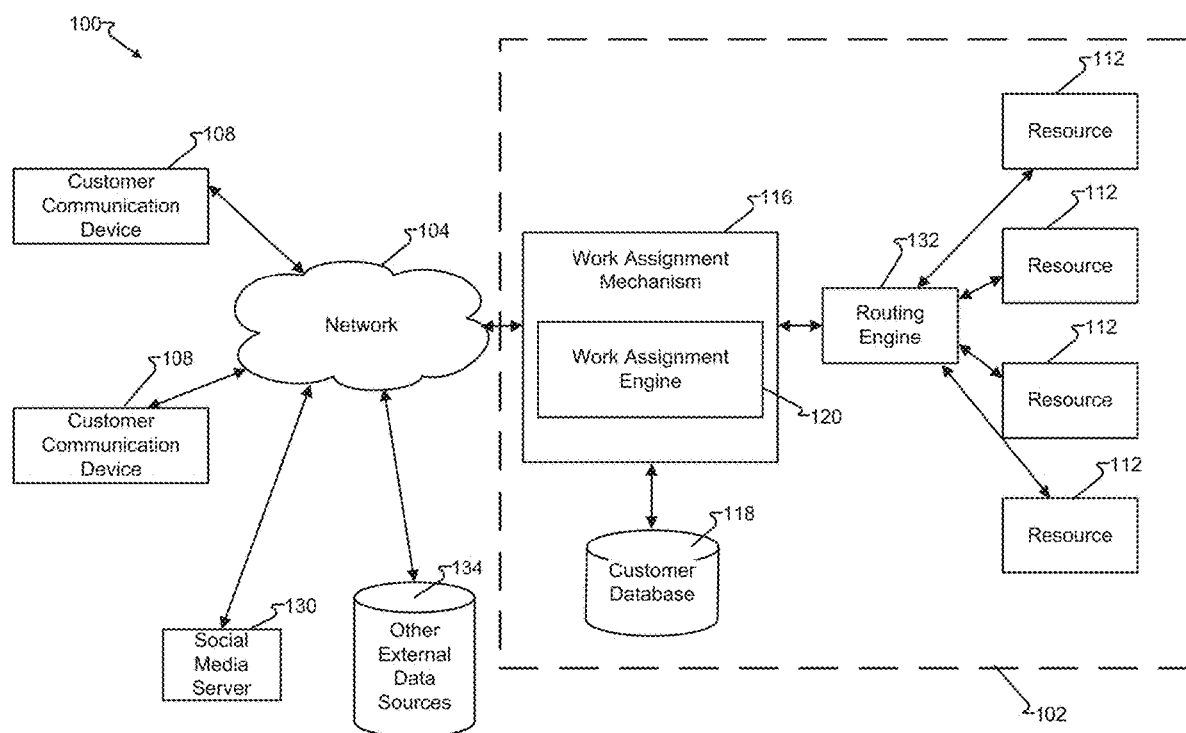
FIG. 1 depicts a first system in accordance with embodiments of the present disclosure.

FIG. 1 depicts communication system 100 in accordance with at least some embodiments of the present disclosure. The communication system 100 may be a distributed system and, in some embodiments, comprises a communication network 104 connecting one or more customer communication devices 108 to a work assignment mechanism 116, which may be owned and operated by an enterprise administering contact center 102 in which a plurality of resources 112 is distributed to handle incoming work items (in the form of contacts) from customer communication devices 108.

Contact center 102 is variously embodied to receive and/or send messages that are or are associated with work items and the processing and management (e.g., scheduling, assigning, routing, generating, accounting, receiving, monitoring, reviewing, etc.) of the work items by one or more resources 112. The work items are generally generated and/or received requests for a processing resource 112 embodied as, or a component of, an electronic and/or electromagnetically conveyed message. Contact center 102 may include more or fewer components than illustrated and/or provide more or fewer services than illustrated. The border indicating contact center 102 may be a physical boundary (e.g., a building, campus, etc.), legal boundary (e.g., company, enterprise, etc.), and/or logical boundary (e.g., resources 112 utilized to provide services to customers for a customer of contact center 102).

Furthermore, the border illustrating contact center 102 may be as-illustrated or, in other embodiments, include alterations and/or more and/or fewer components than illustrated. For example, in other embodiments, one or more of resources 112, customer database 118, and/or other component may connect to routing engine 132 via communication network 104, such as when such components connect via a public network (e.g., Internet). In another embodiment, communication network 104 may be a private utilization of, at least in part, a public network (e.g., VPN); a private network located, at least partially, within contact center 102; or a mixture of private and public networks that may be utilized to provide electronic communication of components described herein. Additionally, it should be appreciated that components illustrated as external, such as social media server 130 and/or other external data sources 134 may be within contact center 102 physically and/or logically, but still be considered external for other purposes. For example, contact center 102 may operate social media server 130 (e.g., a website operable to receive user messages from customers and/or resources 112) as one means to interact with customers via their customer communication device 108.

Customer communication devices 108 are embodied as external to contact center 102 as they are under the more direct control of their respective user or customer. However, embodiments may be provided whereby one or more customer communication devices 108 are physically and/or logically located within contact center 102 and are still considered external to contact center 102, such as when a customer utilizes customer communication device 108 at a kiosk and attaches to a private network of contact center 102 (e.g., WiFi connection to a kiosk, etc.), within or controlled by contact center 102.

It should be appreciated that the description of contact center 102 provides at least one embodiment whereby the following embodiments may be more readily understood without limiting such embodiments. Contact center 102 may be further altered, added to, and/or subtracted from without departing from the scope of any embodiment described herein and without limiting the scope of the embodiments or claims, except as expressly provided.

Additionally, contact center 102 may incorporate and/or utilize social media server 130 and/or other external data sources 134 may be utilized to provide one means for a resource 112 to receive and/or retrieve contacts and connect to a customer of a contact center 102. Other external data sources 134 may include data sources, such as service bureaus, third-party data providers (e.g., credit agencies, public and/or private records, etc.). Customers may utilize their respective customer communication device 108 to send/receive communications utilizing social media server 130.

In accordance with at least some embodiments of the present disclosure, the communication network 104 may comprise any type of known communication medium or collection of communication media and may use any type of protocols to transport electronic messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over IP (VoIP) network, a cellular network, and any other type of packet-switched or circuit-switched network known in the art. In addition, it can be appreciated that the communication network 104 need not be limited to any one network type and instead may be comprised of a number of different networks and/or network types. As one example, embodiments of the present disclosure may be utilized to increase the efficiency of a grid-based contact center 102. Examples of a grid-based contact center 102 are more fully described in U.S. Patent Publication No. 2010/0296417 to Steiner, the entire contents of which are hereby incorporated herein by reference. Moreover, the communication network 104 may comprise a number of different communication media, such as coaxial cable, copper cable/wire, fiber-optic cable, antennas for transmitting/receiving wireless messages, and combinations thereof.

The customer communication devices 108 may correspond to customer communication devices. In accordance with at least some embodiments of the present disclosure, a customer may utilize their customer communication device 108 to initiate a work item. Illustrative work items include, but are not limited to, a contact directed toward and received at a contact center 102, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof. In some embodiments, the communication may not necessarily be directed at the work assignment mechanism 116, but rather may be on some other server in the communication network 104 where it is harvested by the work assignment mechanism 116, which generates a work item for the harvested communication, such as social media server 130. An example of such a harvested communication includes a social media communication that is harvested by the work assignment mechanism 116 from a social media server 130 or network of servers. Exemplary architectures for harvesting social media communications and generating work items based thereon are described in U.S. patent application Ser. Nos. 12/784,369, 12/706,942, and 12/707,277, filed Mar. 20, 2010, Feb. 17, 2010, and Feb. 17, 2010, respectively; each of which is hereby incorporated herein by reference in its entirety.

The format of the work item may depend upon the capabilities of the customer communication device 108 and the format of the communication. In particular, work items are logical representations within a contact center 102 of work to be performed in connection with servicing a communication received at contact center 102 (and, more specifically, the work assignment mechanism 116). The communication may be received and maintained at the work assignment mechanism 116, a switch or server connected to the work assignment mechanism 116, or the like, until a resource 112 is assigned to the work item representing that communication. At which point, the work assignment mechanism 116 passes the work item to a routing engine 132 to connect the customer communication device 108, which initiated the communication, with the assigned resource 112.

Although the routing engine 132 is depicted as being separate from the work assignment mechanism 116, the routing engine 132 may be incorporated into the work assignment mechanism 116 or its functionality may be executed by the work assignment engine 120.

In accordance with at least some embodiments of the present disclosure, the customer communication devices 108 may comprise any type of known communication equipment or collection of communication equipment. Examples of a suitable customer communication device 108 include, but are not limited to, a personal computer, laptop, Personal Digital Assistant (PDA), cellular phone, smart phone, telephone, or combinations thereof. In general, each customer communication device 108 may be adapted to support video, audio, text, and/or data communications with other customer communication devices 108 as well as the processing resources 112. The type of medium used by the customer communication device 108 to communicate with other customer communication devices 108 or processing resources 112 may depend upon the communication applications available on the customer communication device 108.

In accordance with at least some embodiments of the present disclosure, the work item is sent toward a collection of processing resources 112 via the combined efforts of the work assignment mechanism 116 and routing engine 132. The resources 112 can either be completely automated resources (e.g., Interactive Voice Response (IVR) units, microprocessors, servers, or the like), human resources utilizing communication devices (e.g., human agents utilizing a computer, telephone, laptop, etc.), or any other resource known to be used in contact center 102.

As discussed above, the work assignment mechanism 116 and resources 112 may be owned and operated by a common entity in a contact center 102 format. In some embodiments, the work assignment mechanism 116 may be administered by multiple enterprises, each of which has its own dedicated resources 112 connected to the work assignment mechanism 116.

In some embodiments, the work assignment mechanism 116 comprises a work assignment engine 120, which enables the work assignment mechanism 116 to make intelligent routing decisions for work items. In some embodiments, the work assignment engine 120 is configured to administer and make work assignment decisions in a queueless contact center 102, as is described in U.S. patent application Ser. No. 12/882,950, the entire contents of which are hereby incorporated herein by reference. In other embodiments, the work assignment engine 120 may be configured to execute work assignment decisions in a traditional queue-based (or skill-based) contact center 102.

The work assignment engine 120 and its various components may reside in the work assignment mechanism 116 or in a number of different servers or processing devices. In some embodiments, cloud-based computing architectures can be employed whereby one or more hardware components of the work assignment mechanism 116 are made available in a cloud or network such that they can be shared resources among a plurality of different users. Work assignment mechanism 116 may access customer database 118, such as to retrieve records, profiles, purchase history, previous work items, and/or other aspects of a customer known to contact center 102. Customer database 118 may be updated in response to a work item and/or input from resource 112 processing the work item.

It should be appreciated that one or more components of contact center 102 may be implemented in a cloud-based architecture in their entirety, or components thereof (e.g., hybrid), in addition to embodiments being entirely on-premises. In one embodiment, customer communication device 108 is connected to one of resources 112 via components entirely hosted by a cloud-based service provider, wherein processing and data storage hardware components may be dedicated to the operator of contact center 102 or shared or distributed amongst a plurality of service provider customers, one being contact center 102.

In one embodiment, a message is generated by customer communication device 108 and received, via communication network 104, at work assignment mechanism 116. The message received by a contact center 102, such as at the work assignment mechanism 116, is generally, and herein, referred to as a "contact." Routing engine 132 routes the contact to at least one of resources 112 for processing.

Figure 2:
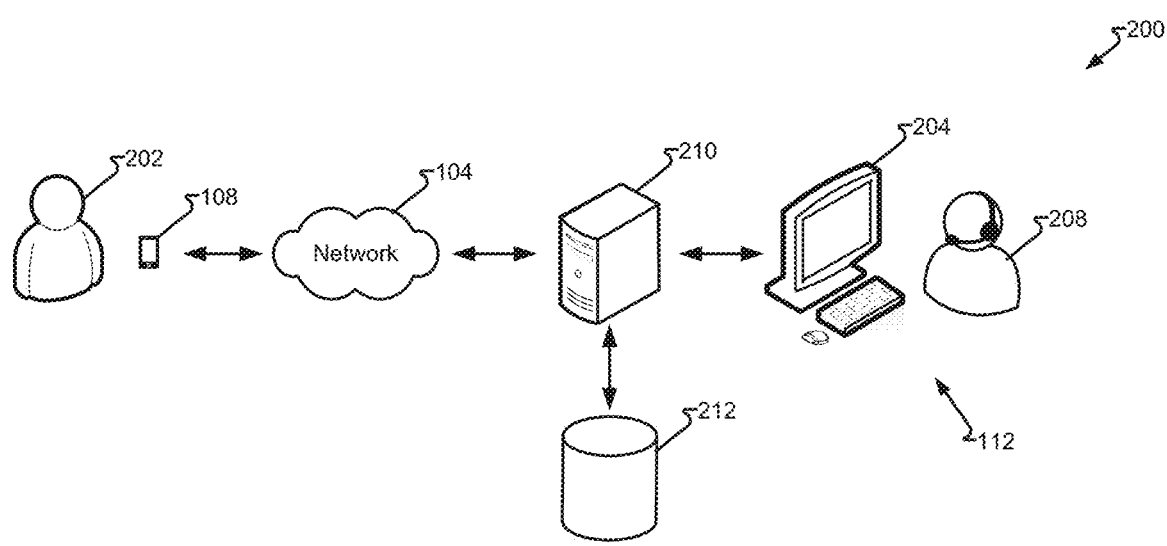
FIG. 2 depicts a second system in accordance with embodiments of the present disclosure.

FIG. 2 depicts system 200 in accordance with embodiments of the present disclosure. In one embodiment, system 200 illustrates communication system 100, in part, wherein portions of communication system 100 are omitted to avoid unnecessarily complicating the figure and associated description. System 200 further illustrates additional components. For example, customer 202 is engaged in a communication with agent 208 utilizing customer communication device 108 and agent communication device 204 to conduct a communication via network 104. The communication comprising a video portion and optionally one or more other portions, such as text and/or voice which may be encoded in a common or distinct channel with the video and/or other forms of communication.

It should be appreciated that the terms "agent" and "customer" are provided as a means of distinguishing features illustrated and not as a limitations as other roles beyond agent and customer are contemplated by the embodiments provided herein. Resource 112 may be embodied as agent 208 utilizing agent communication device 204, which may comprise input-output devices or components for video, audio, text, documents, still images, etc. Similarly, customer communication device 108 comprise input-output devices or components for video, audio, text, documents, still images, etc. While live streaming video is described with respect to the embodiments described in detail herein, in other embodiments recorded or buffered video is also contemplated. In yet another embodiment, the video may comprise augmented reality, such as to allow customer communication device 108 to move, rotate, etc., and maintain the presentation of a video comprising an annotation with respect to the subject of the annotation.

In one embodiment, customer 202 and agent 208 are engaged in a communication during which an issue for resolution is identified. The issue may be a problem (e.g., "my printer isn't working," "the arms on the truck won't lower." etc.), absent feature, upgrade, and/or other issue to be resolved. The subject of the issue may or may not be known. If unknown, embodiments are provided herein to allow the subject to be determined and a candidate resolution identified. For example, a printer may be currently inoperable and the subject of the resolution initially unknown. In yet another embodiment, the communication may comprise a stated issue that is determined to be incorrect. For example, "the network interface in my printer has failed and will no longer attached to the network," may not be the issue, such as when the issue is subsequently determined to be a misconfiguration of network settings following a change to the customer's network. Therefore, while an issue may be expressly stated, the issue may be an abstraction or modification from the expressly stated issue, such as when the issue is a misconfigured network setting and the resolution is to alter the network settings.

In another example, the subject of the resolution is unknown, such as when the issue identifies the subject (e.g., "the hinge-pin is partially dislocated"), wherein the resolution remains to be determined. In other embodiments, the subject and the resolution may be determined in conjunction, such as to resolve the issue a particular resolution is required to address a fault in a particular subject (e.g., "the server port is receiving signals from the hub and requires reconfiguration of the cables.").

In another embodiment, a video stream is captured by customer communication device 108 and provided to agent communication device 204. An annotation of the video stream may be identified and generated by server 210 and/or retrieved from database 212 for presentation on agent communication device 204. Agent 208 may provide modification signals to agent communication device 204 to create a modified resolution, such as to alter the annotation or indicia of the resolution and provide the finalize resolution to customer communication device 108. Additionally or alternatively, database 212 and/or customer database 118 (see FIG. 1) may comprise customer records for agent 208 and/or other resources (e.g., knowledge base, etc.) that may be utilized to narrow the field of prospective resolutions, annotations, and/or other content. For example, if agent 208 is known to have purchased a particular device, the scope of candidate subjects and/or resolutions may be limited to only those applicable to the particular device. The annotation may be forwarded to customer communication device 108 and/or indicia of the annotation provided, such as typed or spoken by agent 208 into the communication with customer communication device 108.

Figure 3:
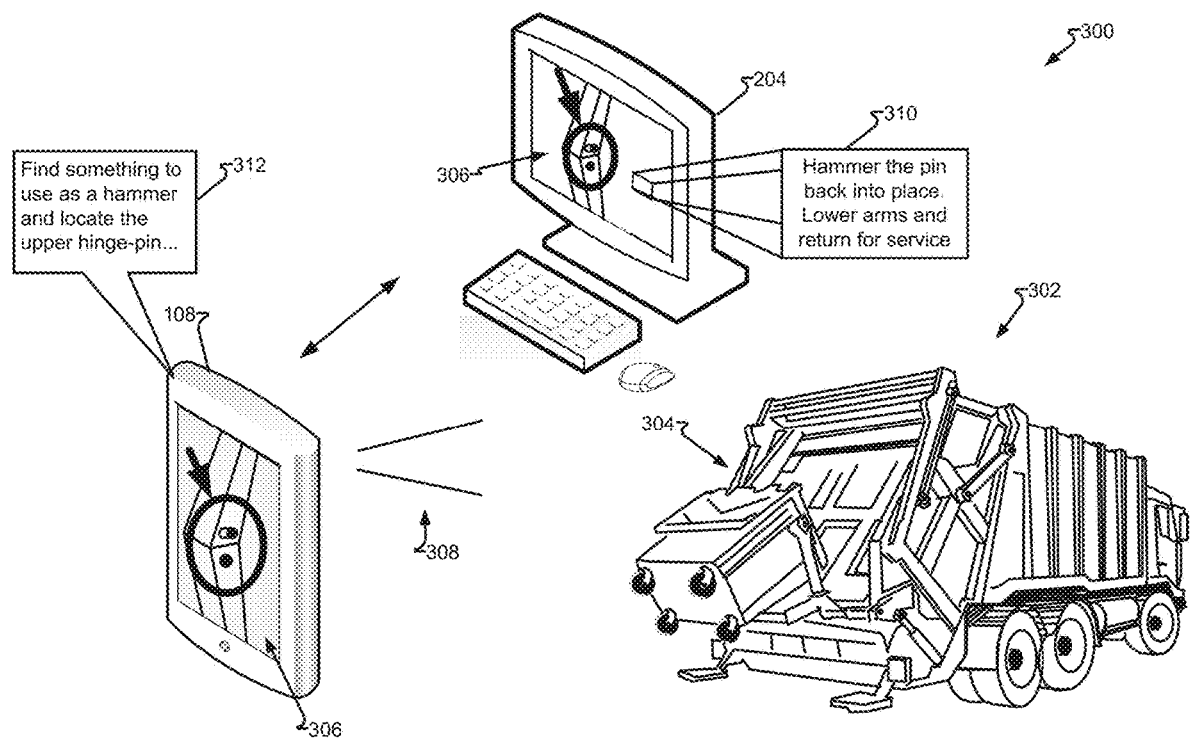
FIG. 3 depicts a third system in accordance with embodiments of the present disclosure.

In another embodiment, server 210 may comprise or access a processor trained to determine an annotation to resolve the issue and/or identify the subject of a resolution of the issue. Server 210 may monitor the communication, which may comprise one or more of live streaming or recorded video, still images, audio, text, and/or other sensor data of customer communication device 108. For example, an audio portion of the communication may comprise cues as to a particular subject and/or resolution to the issue (e.g., "It was working and then I heard a grinding noise . . . "). Server 210 may then search knowledge bases and/or other resources to determine a subset of potential subjects/resolutions wherein non-video content (e.g., spoken content in the communication that identifies a particular change of operation, such as the grinding noise.). In another embodiment, an artificial intelligence (AI), such as a trained neural network, is executed or accessed by server 210 and provided with the communication and optionally non-communication data (e.g., customer record maintained in customer database 118) to determine a candidate resolution comprising a candidate annotation to apply to a video image to resolve the issue. It should be appreciated that the issue may be provided in the audio portion of the communication, FIG. 3 depicts system 300 in accordance with embodiments of the present disclosure. In one embodiment, customer communication device 108 is utilized by agent 208 (see FIG. 2) to capture an image of object 302 within field of view 308 of customer communication device 108. A communication is established between customer communication device 108 and agent communication device 204, the communication comprising a video stream captured by customer communication device 108 and provided to agent communication device 204. Agent communication device 204 is presented with annotation 306 of the video stream provided by customer communication device 108.

In one embodiment, agent communication device 204 is presented with annotation 306, which may comprise graphical annotations (e.g., arrows, circles, animations, colorizations, alternative views, etc.), text, such as text annotation 310, and/or other annotations (e.g., generated speech presented to agent 208). Inputs to agent communication device 204 may modify the candidate annotation or, if acceptable as is, present a resolution comprising indicia of the annotation 312, such as a description, translation, paraphrasing, insertion of omitted features, exclusion of extraneous features, etc. and/or annotation 306 itself. As a result, annotation 306 and/or indicia of the issue may identify subject 304, the issue affecting subject 304, and provide a resolution to the issue.

Figure 4:
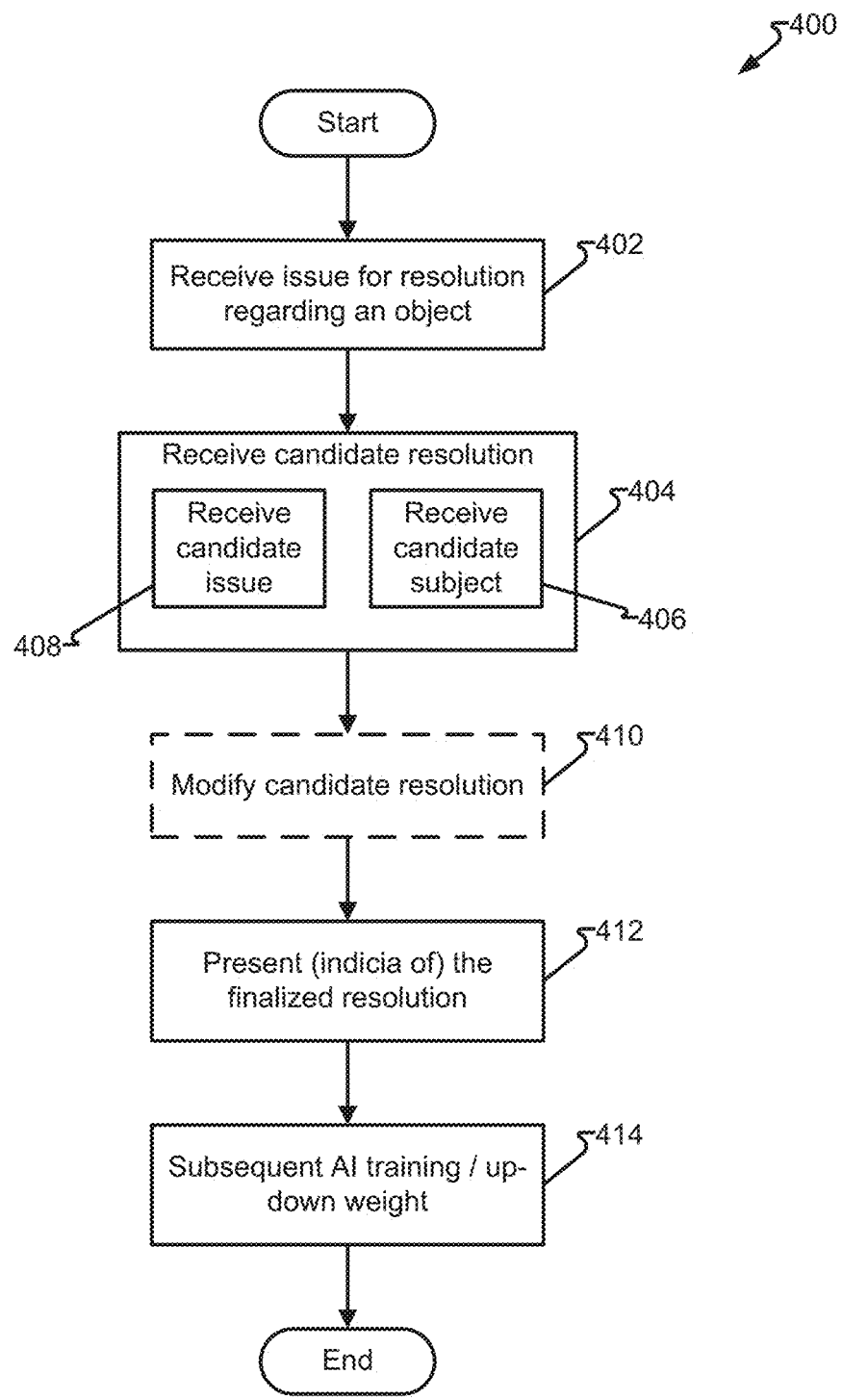
FIG. 4 depicts a first process in accordance with embodiments of the present disclosure.

FIG. 4 depicts process 400 in accordance with embodiments of the present disclosure. In one embodiment, process 400 is embodied as machine-readable instructions that when read by a machine, such as a processor of server 210 and/or other processor, cause the processor to perform the steps of process 400. Process 400 begins and, unless already performed, accesses a communication, such as a communication between customer communication device 108 and agent communication device 204. Step 402 receives an issue for resolution, the issue may be provided within the content (e.g., spoken words, text message, etc.) of the communication. Additionally or alternatively, the issue may be presented by other device, such as a component self-reporting or reporting an issue for a monitored component. For example, a garbage truck may be configured with hardware to self-report an issue. The issue may be automatically determined via monitored speech and/or provided as an input to agent communication device 204 by agent 208.

Next step 404 receives a candidate resolution for the issue. The candidate issue may be provided via database lookup, such as within a record of database 212 and/or other database. In another embodiment, the subject of the issue and/or the issue is unknown or erroneously believed to be known. Step 406 determines the subject of a resolution, such as the target of an action comprising the resolution. Step 408 determines a candidate issue. Steps 408 and 406 may be performed individually, in series, or in parallel, such as when a particular target resolution comprises a further determination of a subject of the resolution. With step 404 complete, a candidate resolution, comprising a candidate annotation to the determined candidate issue and/or subject is determined. Step 404 may annotate a video stream, such as with graphical elements, text, descriptive audio, and/or other annotations to comprise a candidate resolution.

Optional step 410 may receive modifications to the candidate resolution, which may optionally include modifications to the candidate annotation, candidate issue, and/or candidate subject. For example, step 404 may be determined by a trained neural network and provide a result that is known by agent 208 to be erroneous (e.g., non-applicable, outdated, unable to resolve the issue, omitting required information, etc.). As a result, agent 208 may provide modification inputs to agent communication device 204 to modify the candidate resolution, or portion thereof, and create therefrom a finalized resolution. The finalized resolution, and/or indicia of the finalized resolution, is presented in step 412.

Optionally, step 410 may modify a resolution in a manner that requires a supervisor and/or subject matter expert to approve. For example, a signal from a secondary device(s), such as operated by a supervisor and/or subject matter expert, may be required to incorporate modifications provided to agent communication device 204 to modify a candidate resolution provided in step 404.

Step 414 receives feedback from agent 208, customer 202, and/or other systems or components to determine if the finalized resolution was or was not successful. If a modification was provided in step 410 and the resolution was successful, the modification may be incorporated into a subsequent database, up-weighted in a knowledgebase, and/or training session of the neural network so as to be more likely to be presented in a subsequent communication with the same issue to resolve. Conversely, the modification may be omitted from a database, down-weighted in a knowledgebase, and/or training session of the neural network so as to be less likely to be presented in a subsequent communication with the same issue to resolve. Such a failed modification may be maintained as an example of a resolution to an issue to avoid. As a result, a subsequent communication wherein an agent attempts to provide a similar modification may be flagged as unlikely to resolve the issue.

Figure 5:
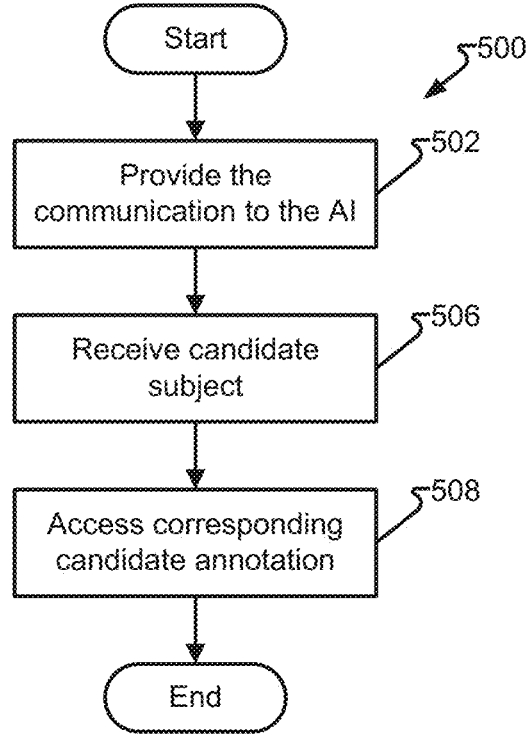
FIG. 5 depicts a second process in accordance with embodiments of the present disclosure.

FIG. 5 depicts process 500 in accordance with embodiments of the present disclosure. In one embodiment, process 500 is embodied as machine-readable instructions that when read by a machine, such as a processor of server 210 and/or other processor, cause the processor to perform the steps of process 500. In one embodiment, step 406 (see FIG. 4) is performed by process 500, such as to determine the subject of a candidate resolution.

Process 500 begins and provides the communication to an AI, such as neural network, trained to determine a subject of a resolution. The communication may comprise the video stream and/or other media (e.g., voice, text, documents, etc.). Additionally or alternatively, step 502 may include other records, such as those maintained in customer database 118, database 212, and/or other data repository. As a result, the neural network determines a candidate subject, which is then received, such as at server 210, in step 506. With the subject known, step 508 accesses the corresponding annotation. Step 508 may be embodied as look-up, such as in database 212, or a further inquiry, such as the execution of process 600 (see FIG. 6).

Figure 6:
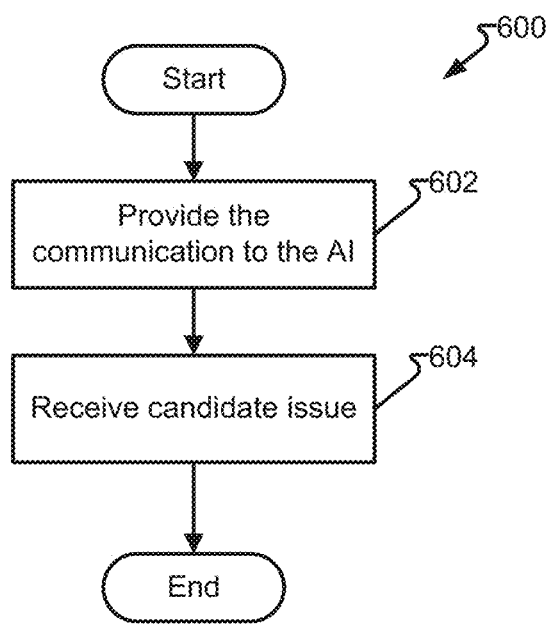
FIG. 6 depicts a third process in accordance with embodiments of the present disclosure.

FIG. 6 depicts process 600 in accordance with embodiments of the present disclosure. In one embodiment, process 600 is embodied as machine-readable instructions that when read by a machine, such as a processor of server 210 and/or other processor, cause the processor to perform the steps of process 600. The communication may comprise the video stream and/or other media (e.g., voice, text, documents, etc.). Additionally or alternatively, step 602 may include other records, such as those maintained in customer database 118, database 212, and/or other data repository. In one embodiment, the communication is provided to an AI, such as a neural network, trained to identify candidate issue captured in a video stream and/or other portion of the communication. Step 604 then receives, such as by server 210 and/or agent communication device 204, the candidate resolution. It should be appreciated that a candidate resolution may be known without the subject of a resolution known. For example, a bearing on a machine may be determined to have failed and a candidate resolution determined. The candidate resolution may be further annotated by the determination of a specific bearing to replace, such as by execution of process 500.

Figure 7:
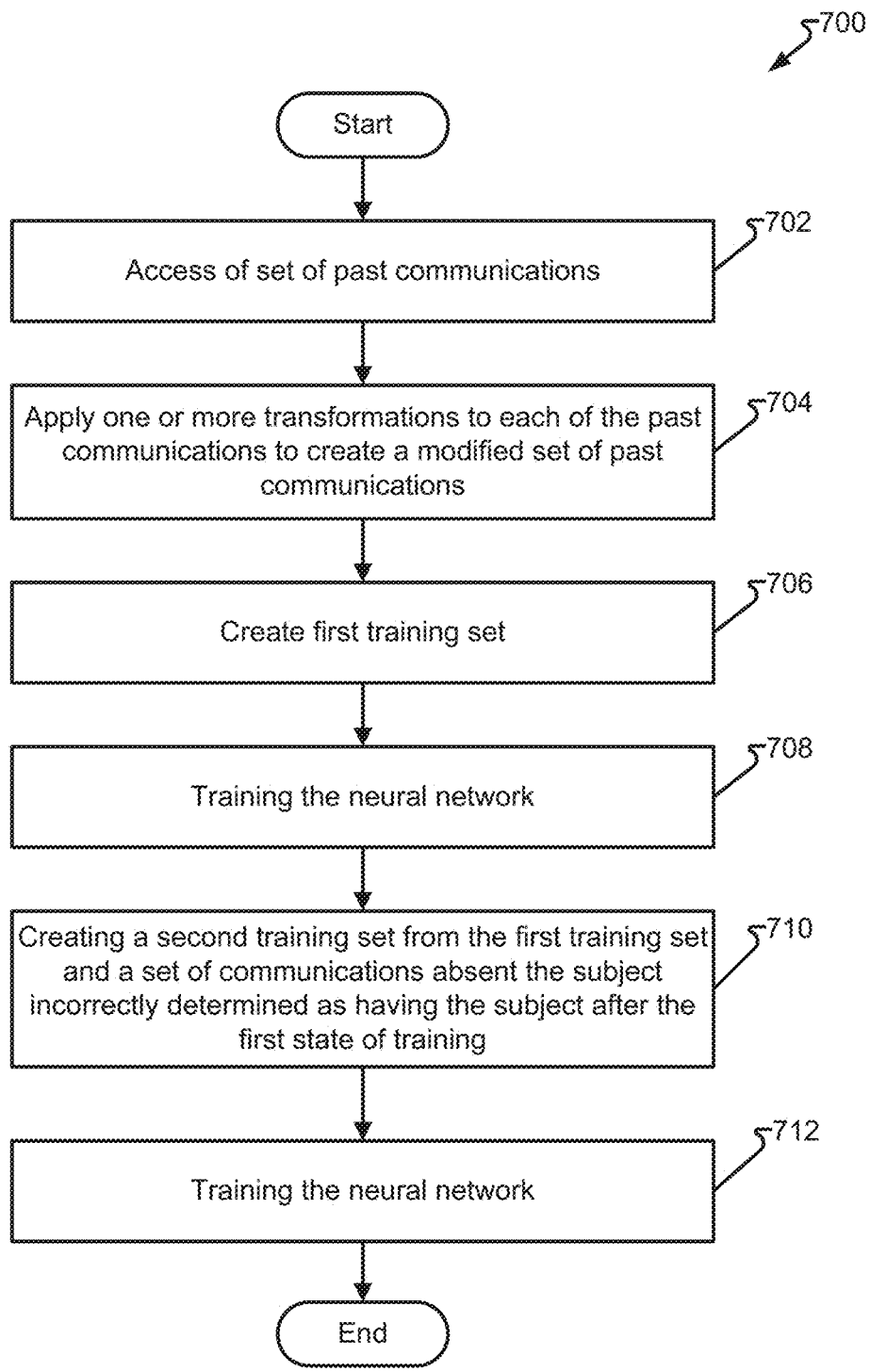
FIG. 7 depicts a fourth process in accordance with embodiments of the present disclosure.

FIG. 7 depicts process 700 in accordance with embodiments of the present disclosure. In one embodiment, process 700 is embodied as machine-readable instructions that when read by a machine, such as a processor of server 210 and/or other processor, cause the processor to perform the steps of process 700. In one embodiment, process 700 trains a neural network to determine the subject of a candidate resolution.

A neural network, as is known in the art and in one embodiment, self-configures layers of logical nodes having an input and an output. If an output is below a self-determined threshold level, the output is omitted (i.e., the inputs are within the inactive response portion of a scale and provide no output), if the self-determined threshold level is above the threshold, an output is provided (i.e., the inputs are within the active response portion of a scale and provide an output), the particular placement of the active and inactive delineation is provided as a training step or steps. Multiple inputs into a node produce a multi-dimensional plane (e.g., hyperplane) to delineate a combination of inputs that are active or inactive.

Process 700 begins and step 700 accesses a set of past communications in step 702, such as may be maintained in database 212 and/or other data repository. The set of past communications comprise the subject or substantially comprise the subject (e.g., a machine and acceptable variations of the machine such as between models and/or configurations of the machine that provide for non-consequential variations from the machine with respect to an issue and/or resolution of an issue). Step 704 applies one or more transformations to the image portion, in one embodiment, or the not-image portion (e.g., speech, text message, CRM entry, etc.), in another embodiment. For image portions of a communication, the transformations comprise one or more of mirroring, rotating, smoothing, contrast reduction, contrast increase, brightness increase, brightness decrease, hue variation, saturation variation, color variation, removal and/or insertion of digital noise, and/or removal and/or insertion of physical artifacts (e.g., dirt, chipped paint, repositioning of movable elements, etc.). Step 706 creates a first training set to the set of past communications and further applies one or more transformations to the non-image portion comprising one or more of substituting an identifier of the subject with a synonymous identifier, substituting an identifier of the issue with a synonymous issue, substituting a word with a synonymous word, substituting a word with a synonymous phrase, inserting at least one redundant word, or removing at least one redundant word, altering a time of day of the communication, altering the day of the week of the communication, altering the day of the year of the communication, altering a customer attribute for a customer, and/or altering the subject of the communication. A transformation may be applied to an image portion alone, a non-image portion alone, and/or both an image portion and non-image portion. Embodiments of the image portion may comprise video and/or still images. Embodiments of the non-image portion may comprise text, speech, text-from-speech, and/or documents referenced during a communication. The first training set comprising the set of past communications, the modified set of past communications, and a set of communications absent the subject. In step 708, a first training stage is performed on the neural network comprising the first training set.

Step 710 then crease a second training set from the first training set further comprising a set of communications absent the subject that were incorrectly identified as having the subject after the first training stage. Step 712 trains the neural network in a second training stage utilizing the second training set.

As a result of training the neural network in process 700, a communication may be provided to at least one processor executing the neural network and receive therefrom a subject, such as a portion of an object (e.g., FIG. 3, ref 302).

Figure 8:
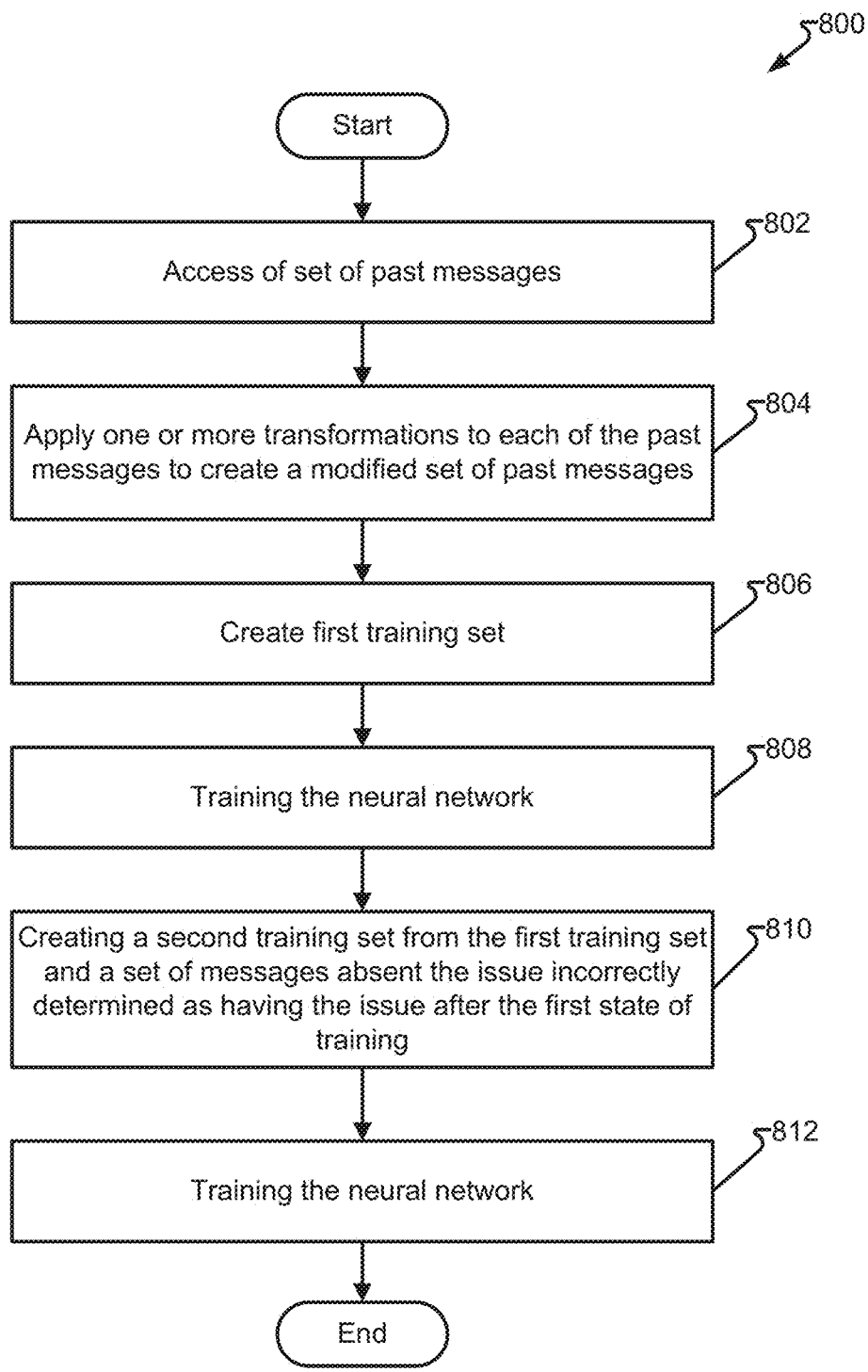
FIG. 8 depicts a fifth process in accordance with embodiments of the present disclosure.

FIG. 8 depicts process 800 in accordance with embodiments of the present disclosure. In one embodiment, process 800 is embodied as machine-readable instructions that when read by a machine, such as a processor of server 210 and/or other processor, cause the processor to perform the steps of process 800. In one embodiment, process 800 trains a neural network to determine the subject of a candidate resolution.

Process 800 begins and step 802 accesses a set of past communications in step 802, such as may be maintained in database 212 and/or other data repository. The set of past communications comprise the issue or substantially comprise the issue (e.g., a machine and acceptable variations of the machine such as between models and/or configurations of the machine that provide for non-consequential variations from the machine with respect to an issue and/or resolution of an issue). Step 804 applies one or more transformations to the image portion, in one embodiment, or the not-image portion (e.g., speech, text message, CRM entry, etc.), in another embodiment. For image portions of a communication, the transformations comprise one or more of mirroring, rotating, smoothing, contrast reduction, contrast increase, brightness increase, brightness decrease, hue variation, saturation variation, color variation, removal and/or insertion of digital noise, and/or removal and/or insertion of physical artifacts (e.g., dirt, chipped paint, repositioning of movable elements, etc.). Step 806 creates a first training set to the set of past communications and further applies one or more transformations to the non-image portion comprising one or more of substituting an identifier of the issue with a synonymous identifier, substituting an identifier of the issue with a synonymous issue, substituting a word with a synonymous word, substituting a word with a synonymous phrase, inserting at least one redundant word, or removing at least one redundant word, altering a time of day of the communication, altering the day of the week of the communication, altering the day of the year of the communication, altering a customer attribute for a customer, and/or altering the issue of the communication. A transformation may be applied to an image portion alone, a non-image portion alone, and/or both an image portion and non-image portion. Embodiments of the image portion may comprise video and/or still images. Embodiments of the non-image portion may comprise text, speech, text-from-speech, and/or documents referenced during a communication. The first training set comprising the set of past communications, the modified set of past communications, and a set of communications absent the issue. In step 808, a first training stage is performed on the neural network comprising the first training set.

Step 810 then crease a second training set from the first training set further comprising a set of communications absent the issue that were incorrectly identified as having the issue after the first training stage. Step 812 trains the neural network in a second training stage utilizing the second training set.

As a result of training the neural network in process 800, a communication may be provided to at least one processor executing the neural network and receive therefrom an issue and a candidate resolution associated with the issue.

Figure 9:
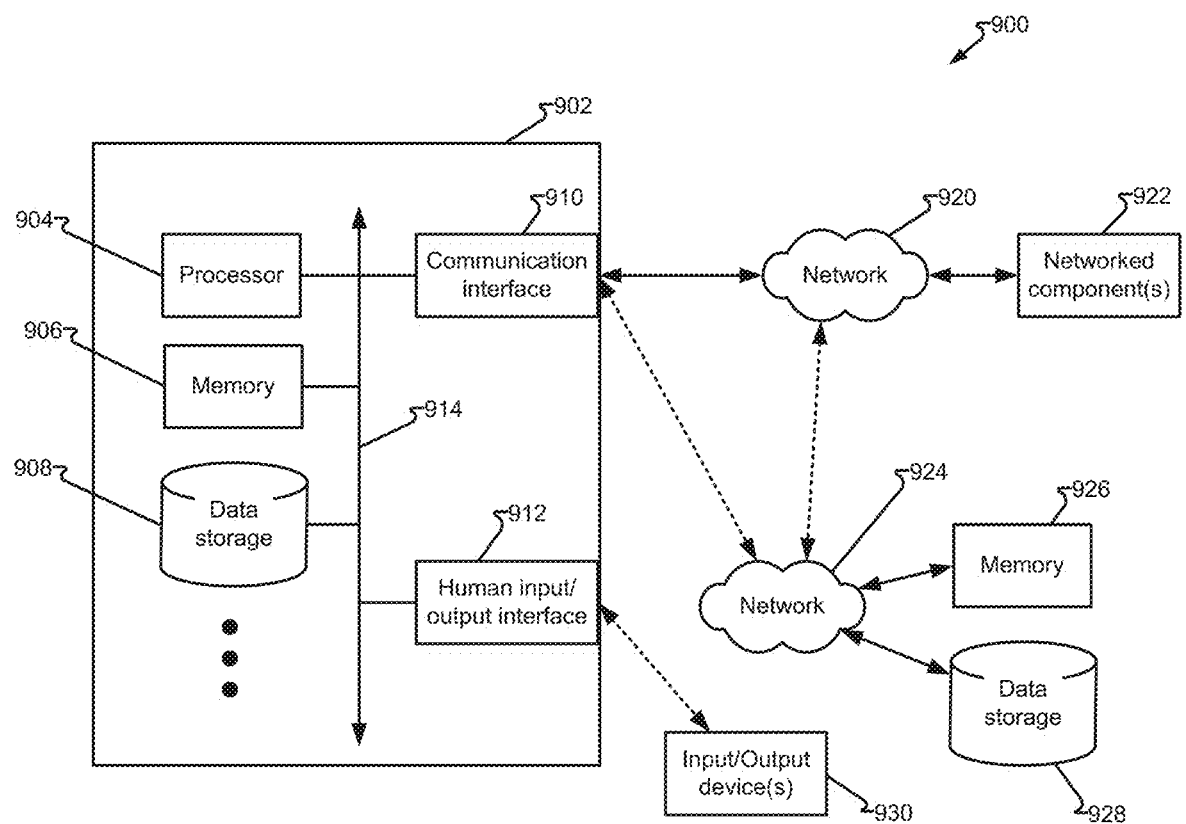
FIG. 9 depicts a fourth system in accordance with embodiments of the present disclosure.

FIG. 9 depicts device 902 in system 900 in accordance with embodiments of the present disclosure. In one embodiment, server 210 and/or agent communication device 204 may be embodied, in whole or in part, as device 902 comprising various components and connections to other components and/or systems. The components are variously embodied and may comprise processor 904. The term "processor," as used herein, refers exclusively to electronic hardware components comprising electrical circuitry with connections (e.g., pin-outs) to convey encoded electrical signals to and from the electrical circuitry. Processor 904 may be further embodied as a single electronic microprocessor or multiprocessor device (e.g., multicore) having electrical circuitry therein which may further comprise a control unit(s), input/output unit(s), arithmetic logic unit(s), register(s), primary memory, and/or other components that access information (e.g., data, instructions, etc.), such as received via bus 914, executes instructions, and outputs data, again such as via bus 914. In other embodiments, processor 904 may comprise a shared processing device that may be utilized by other processes and/or process owners, such as in a processing array within a system (e.g., blade, multi-processor board, etc.) or distributed processing system (e.g., "cloud", farm, etc.). It should be appreciated that processor 904 is a non-transitory computing device (e.g., electronic machine comprising circuitry and connections to communicate with other components and devices). Processor 904 may operate a virtual processor, such as to process machine instructions not native to the processor (e.g., translate the VAX operating system and VAX machine instruction code set into Intel® 9xx chipset code to allow VAX-specific applications to execute on a virtual VAX processor), however, as those of ordinary skill understand, such virtual processors are applications executed by hardware, more specifically, the underlying electrical circuitry and other hardware of the processor (e.g., processor 904). Processor 904 may be executed by virtual processors, such as when applications (i.e., Pod) are orchestrated by Kubernetes. Virtual processors allow an application to be presented with what appears to be a static and/or dedicated processor executing the instructions of the application, while underlying non-virtual processor(s) are executing the instructions and may be dynamic and/or split among a number of processors.

In addition to the components of processor 904, device 902 may utilize memory 906 and/or data storage 908 for the storage of accessible data, such as instructions, values, etc. Communication interface 910 facilitates communication with components, such as processor 904 via bus 914 with components not accessible via bus 914. Communication interface 910 may be embodied as a network port, card, cable, or other configured hardware device. Additionally or alternatively, human input/output interface 912 connects to one or more interface components to receive and/or present information (e.g., instructions, data, values, etc.) to and/or from a human and/or electronic device. Examples of input/output devices 930 that may be connected to input/output interface include, but are not limited to, keyboard, mouse, trackball, printers, displays, sensor, switch, relay, speaker, microphone, still and/or video camera, etc. In another embodiment, communication interface 910 may comprise, or be comprised by, human input/output interface 912. Communication interface 910 may be configured to communicate directly with a networked component or utilize one or more networks, such as network 920 and/or network 924.

Communication network 104 may be embodied, in whole or in part, as network 920. Network 920 may be a wired network (e.g., Ethernet), wireless (e.g., WiFi, Bluetooth, cellular, etc.) network, or combination thereof and enable device 902 to communicate with networked component(s) 922. In other embodiments, network 920 may be embodied, in whole or in part, as a telephony network (e.g., public switched telephone network (PSTN), private branch exchange (PBX), cellular telephony network, etc.)

Additionally or alternatively, one or more other networks may be utilized. For example, network 924 may represent a second network, which may facilitate communication with components utilized by device 902. For example, network 924 may be an internal network to a business entity or other organization, such as contact center 102, whereby components are trusted (or at least more so) that networked components 922, which may be connected to network 920 comprising a public network (e.g., Internet) that may not be as trusted.

Components attached to network 924 may include memory 926, data storage 928, input/output device(s) 930, and/or other components that may be accessible to processor 904. For example, memory 926 and/or data storage 928 may supplement or supplant memory 906 and/or data storage 908 entirely or for a particular task or purpose. For example, memory 926 and/or data storage 928 may be an external data repository (e.g., server farm, array, "cloud," etc.) and allow device 902, and/or other devices, to access data thereon. Similarly, input/output device(s) 930 may be accessed by processor 904 via human input/output interface 912 and/or via communication interface 910 either directly, via network 924, via network 920 alone (not shown), or via networks 924 and 920. Each of memory 906, data storage 908, memory 926, data storage 928 comprise a non-transitory data storage comprising a data storage device.

It should be appreciated that computer readable data may be sent, received, stored, processed, and presented by a variety of components. It should also be appreciated that components illustrated may control other components, whether illustrated herein or otherwise. For example, one input/output device 930 may be a router, switch, port, or other communication component such that a particular output of processor 904 enables (or disables) input/output device 930, which may be associated with network 920 and/or network 924, to allow (or disallow) communications between two or more nodes on network 920 and/or network 924. For example, a connection between one particular customer, using a particular customer communication device 108, may be enabled (or disabled) with a particular networked component 922 and/or particular resource 112. Similarly, one particular networked component 922 and/or resource 112 may be enabled (or disabled) from communicating with a particular other networked component 922 and/or resource 112, including, in certain embodiments, device 902 or vice versa. One of ordinary skill in the art will appreciate that other communication equipment may be utilized, in addition or as an alternative, to those described herein without departing from the scope of the embodiments.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components and included, in one or more embodiments, voltages in memory circuits, configuration of switching circuits, and/or by selective use of particular logic gate circuits. Additionally or alternative, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessor may be integrated into a single processing appliance (e.g., computer, server, blade, etc.) or located entirely or in part in a discrete component connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein as provided by one or more processing components.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system, comprising:
a network interface to a network; and
a processor comprising machine-readable instructions maintained in a non-transitory storage that, when read by the processor, cause the processor to perform:

accessing a communication between an agent communication device and a customer communication device via the network and wherein the communication comprises a video stream captured by the customer communication device, wherein the communication comprises an issue for resolution for an object and an object image;
providing the communication to a neural network trained to determine a candidate resolution;
receiving, from the neural network, a candidate resolution;
presenting, the video stream comprising the candidate resolution to the agent communication device, wherein the candidate resolution comprises a candidate annotation corresponding to the candidate resolution; and
creating a finalized resolution from the candidate resolution and presenting indicia of the finalized resolution to the customer communication device.

2. The system of claim 1, further comprising training the neural network to determine the candidate resolution comprising identification of a subject of the issue:
collecting a set of past communications from a database, each of which substantially comprise the subject;
applying one or more transformations to an image portion of each past communications including mirroring, rotating, smoothing, or contrast reduction to create a modified set of past communications;
creating a first training set comprising the collected set of past communications, the modified set of past communications, and a set of past communications absent the subject;
training the neural network in a first stage of training using the first training set;
creating a second training set for a second stage of training comprising the first training set and past communications absent the subject that are incorrectly detected as communications comprising the subject after the first stage of training; and
training the neural network in the second stage of training using the second training set.

3. The system of claim 1, further comprising training the neural network to determine the candidate resolution comprising:
collecting a set of past communications from a database, each of which substantially comprise the issue;
applying one or more transformations to a non-image portion of each past communications including substituting an identifier of a subject with a synonymous identifier, substituting an identifier of the issue with a synonymous issue, substituting a word with a synonymous word, substituting a word with a synonymous phrase, inserting at least one redundant word, or removing at least one redundant word, altering a time of day of the communication, to create a modified set of past communications;
creating a first training set comprising the collected set of past communications, the modified set of past communications, and a set of past communications devoid of the issue;
training the neural network in a first stage using the first training set;
creating a second training set for a second stage of training comprising the first training set and past communications devoid of the issue that are incorrectly detected as communications comprising the issue after the first stage of training; and
training the neural network in the second stage of training using the second training set.

4. The system of claim 3, further comprising:
a database; and
wherein the instructions cause the processor to further perform:
creating a modified resolution comprising the candidate annotation as modified by input signals provided to the agent communication device; and
setting the modified resolution as the finalized resolution.

5. The system of claim 4, wherein the instructions cause the processor to further perform creating the modified resolution comprising the indicia of the resolution as modified by input signals provided to the agent communication device.

6. The system of claim 5, wherein training the neural network further comprises:
creating a third training set comprising the candidate resolution identified as inaccurate, upon determining the modified resolution differs from the candidate resolution; and
training the neural network in a third state using the third training set.

7. The system of claim 5, wherein setting the modified resolution as the finalized resolution further comprises receiving an authorization from a supervisory communication device.

8. The system of claim 1, wherein the instructions further comprise instructions to cause the processor to perform accessing the candidate resolution, from a first plurality of candidate resolutions corresponding to a subject and excluding a second plurality of the candidate resolutions not corresponding to the subject.

9. The system of claim 1, wherein the candidate resolution further comprises indicia of the candidate resolution.

10. The system of claim 1, wherein presenting indicia of the finalized resolution to the customer communication device comprises presenting the finalized resolution to the customer communication device.

11. The system of claim 1, wherein the communication comprises at least one of (1) an audio portion comprising speech from at least one of an agent and a customer utilizing the agent communication device and the customer communication device, respectively and (2) a text portion comprising textual content from at least one of the agent and the customer utilizing the agent communication device and the customer communication device, respectively.

12. A system, comprising:
a network interface to a network; and
a processor comprising machine-readable instructions maintained in a non-transitory storage that, when read by the processor, cause the processor to perform:
accessing a communication between an agent communication device and a customer communication device via the network and wherein the communication comprises a video stream captured by the customer communication device, wherein the communication comprises an issue for resolution for an object and an object image;
providing the communication to a neural network trained to determine a candidate subject;
receiving, from the neural network, a candidate resolution comprising indicia of the candidate subject;
presenting, the video stream comprising the candidate resolution to the agent communication device, wherein the candidate resolution comprises a candidate annotation corresponding to the candidate resolution; and creating a finalized resolution from the candidate resolution and presenting indicia of the finalized resolution to the customer communication device.

13. The system of claim 12, further comprising training the neural network to determine the candidate resolution comprising the candidate subject:

collecting a set of digital subject images from a database;
applying one or more transformations to each digital subject image including mirroring, rotating, smoothing, or contrast reduction to create a modified set of digital subject images;
creating a first training set comprising the collected set of digital subject images, the modified set of digital subject images, and a set of digital non-subject images;
training the neural network in a first stage of training using the first training set;
creating a second training set for a second stage of training comprising the first training set and digital non-subject images that are incorrectly detected as digital subject images after the first stage of training; and
training the neural network in the second stage of training using the second training set.

14. The system of claim 12, further comprising training the neural network to determine the candidate resolution comprising the candidate subject:

collecting a set of past communications from a database, each of which comprise a reference to the object;
applying one or more transformations to a non-image portion of each past communications including substituting an identifier of the candidate subject with a synonymous identifier, substituting an identifier of the issue with a synonymous issue, substituting a word with a synonymous word, substituting a word with a synonymous phrase, inserting at least one redundant word, or removing at least one redundant word, altering a time of day of the communication, to create a modified set of past communications;
creating a first training set comprising the collected set of past communications, the modified set of past communications, and a set of past communications devoid of the candidate subject;
training the neural network in a first stage of training using the first training set;
creating a second training set for a second stage of training comprising the first training set and past communications devoid of the issue that are incorrectly detected as communications comprising the issue after the first stage of training; and
training the neural network in the second stage of training using the second training set.

15. The system of claim 14, further comprising:

a database; and
wherein the instructions cause the processor to further perform:
creating a modified resolution comprising the candidate annotation as modified by input signals provided to the agent communication device; and
setting the modified resolution as the finalized resolution.

16. The system of claim 15, wherein the instructions cause the processor to further perform creating the modified resolution comprising the indicia of the resolution as modified by input signals provided to the agent communication device.

17. The system of claim 16, wherein training the neural network further comprises:

creating a third training set comprising the candidate resolution identified as inaccurate, upon determining the modified resolution differs from the candidate resolution; and
training the neural network in a third state using the third training set.

18. The system of claim 16, wherein setting the modified resolution as the finalized resolution further comprises receiving an authorization from a supervisory communication device.

19. The system of claim 17, wherein presenting indicia of the finalized resolution to the customer communication device comprises presenting the finalized resolution to the customer communication device.

20. A method, comprising:

accessing a communication between an agent communication device and a customer communication device via a network and wherein the communication comprises a video stream captured by the customer communication device, wherein the communication comprises an issue for resolution for an object and an object image;
providing the communication to a neural network trained to determine a candidate resolution;
receiving, from the neural network, a candidate resolution;
accessing, a candidate annotation corresponding to the candidate resolution;
presenting, the video stream comprising the candidate resolution to the agent communication device, wherein the candidate resolution comprises the candidate annotation; and
creating a finalized resolution from the candidate resolution; and
presenting indicia of the finalized resolution to the customer communication device.

* * * * *